United States Patent
Miller et al.

(10) Patent No.: US 7,271,709 B2
(45) Date of Patent: Sep. 18, 2007

(54) ROBUST METHOD AND SYSTEM FOR THE AUTOMATIC DETECTION OF A DETACHED REMOTE TIRE PRESSURE SENSOR OF A TIRE PRESSURE MONITORING SYSTEM

(75) Inventors: Thomas Miller, Ann Arbor, MI (US); Thomas McQuade, Ann Arbor, MI (US); Srini Racha, Walled Lake, MI (US); Karl Wojcik, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 11/161,835

(22) Filed: Aug. 18, 2005

(65) Prior Publication Data

US 2007/0040660 A1 Feb. 22, 2007

(51) Int. Cl.
*B60C 23/00* (2006.01)
(52) U.S. Cl. .......................................... 340/442; 73/146
(58) Field of Classification Search ........ 340/442–448; 116/34; 152/415; 73/146, 49
See application file for complete search history.

(56) References Cited

U.S. PATENT DOCUMENTS

| 5,731,754 A * | 3/1998 | Lee et al. ................... 340/447 |
| 6,034,596 A | 3/2000 | Smith et al. |
| 6,445,287 B1 * | 9/2002 | Schofield et al. ........... 340/442 |
| 6,771,169 B1 | 8/2004 | Kaminski et al. |
| 2005/0011257 A1 | 1/2005 | Modawell et al. |
| 2006/0130570 A1 | 6/2006 | Anders |

* cited by examiner

*Primary Examiner*—Jeffery Hofsass
*Assistant Examiner*—Sigmund Tang
(74) *Attorney, Agent, or Firm*—Fredrick Owens; Dickinson Wright PLLC

(57) ABSTRACT

A tire pressure monitoring system for detachment detection of a tire pressure sensor is provided. The system includes a tire pressure sensor, a receiver and a controller. The tire pressure sensor includes a transmitter for transmitting a word having a detachment state. The receiver is for receiving the word and is coupled to the controller. The controller decodes the word and determines the detachment state of the tire pressure sensor. A robust method for the automatic detection of a detached tire pressure sensor of a tire pressure monitoring system is also provided.

20 Claims, 4 Drawing Sheets

ROBUST METHOD AND SYSTEM FOR THE AUTOMATIC DETECTION OF A DETACHED REMOTE TIRE PRESSURE SENSOR OF A TIRE PRESSURE MONITORING SYSTEM

TECHNICAL FIELD

The present invention relates generally to a tire pressure monitoring system for an automotive vehicle, and more particularly, to a method and system for the detection of a detached tire pressure sensor in a tire.

BACKGROUND OF THE INVENTION

Various types of pressure sensing systems for monitoring the pressure within the tires of an automotive vehicle have been proposed. Such systems generate a pressure signal using an electromagnetic (EM) signal, which is transmitted to a receiver. The pressure signal corresponds to the pressure within the tire. When the tire pressure drops below a predetermined pressure, an indicator is used to signal the vehicle operator of the low pressure. Because these systems require the mounting of a sensor within the inside of a tire/wheel assembly it is necessary to know that the sensor is attached as required. Because visual inspection is impaired by the tire and wheel it becomes difficult to monitor the sensor's attachment without unnecessary removal or servicing of the tire and wheel. Accordingly, it would be desirable to provide an automatic or robust system for determining whether the tire pressure sensor is properly, or at least adequately, attached to its mounting.

Such a method or system may take advantage of the existing capabilities in the tire pressure sensor. However, power is limited, thus a system for the detection of tire pressure sensor detachment should not necessitate unnecessary servicing just to recharge or replace the sensor. It would therefore also be desirable to provide a tire pressure monitoring system that reduces the need to service the tire in order to verify the mounting of the pressure sensor in the tire while preserving the power within the sensor.

SUMMARY OF THE INVENTION

A tire pressure monitoring system for detachment detection of a tire pressure sensor is provided. The system includes a tire pressure sensor, a receiver and a controller. The tire pressure sensor includes a transmitter for transmitting a word having a detachment state. The receiver is for receiving the word and is coupled to the controller. The controller decodes the word and determines the detachment state of the tire pressure sensor.

In a first aspect of the invention, a detachment detector that is included within the tire pressure sensor determines the detachment state. The detachment detector of this first aspect is a simple voltage divider/comparator circuit as explained below.

In a second aspect of the invention, the detachment detector is a switch circuit as explained below. The switch circuit has the advantage of minimal to no power consumption when the tire pressure sensor is properly attached to a wheel of a vehicle. In a final aspect of the invention, the detachment detector utilizes an accelerometer to determine the attachment/detachment of the tire pressure sensor.

A robust method for the automatic detection of a detached tire pressure sensor of a tire pressure monitoring system is also provided.

Other advantages and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
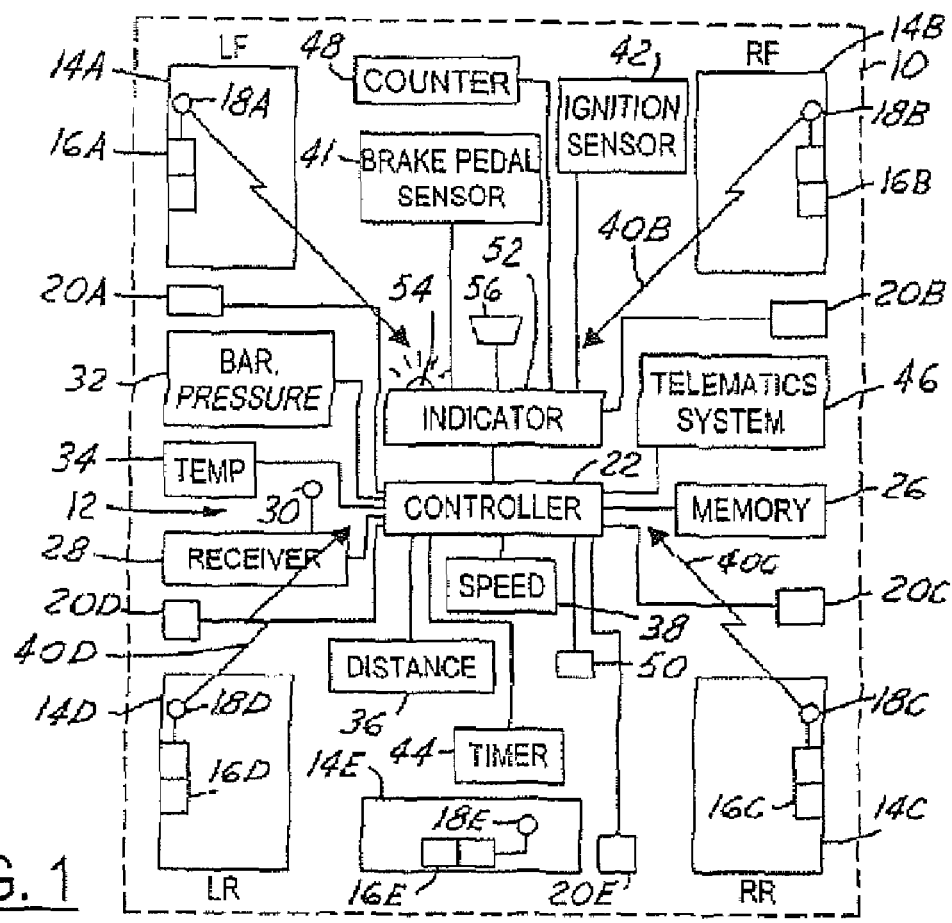
FIG. 1 is a block diagrammatic view of a pressure monitoring system according to the present invention.

In the following figures, the same reference numerals will be used to illustrate the same components. Those skilled in the art will recognize that the various components set forth herein could be changed without varying from the scope of the invention.

Referring now to FIG. 1, an automotive vehicle 10 has a pressure monitoring system 12 for monitoring the air pressure within a left front tire 14a, a right front tire 14b, a right rear tire 14c, and a left rear tire 14d. Each tire 14a-14d has a respective tire pressure sensor circuit 16a, 16b, 16c, and 16d, each of which has a respective antenna 18a, 18b, 18c, and 18d. Each tire is positioned upon a corresponding wheel.

A fifth tire or spare tire 14e is also illustrated having a tire pressure sensor circuit 16e and a respective antenna 18e. Although five wheels are illustrated, the pressure of various numbers of wheels may be increased. For example, the present invention applies equally to vehicles such as pickup trucks that have dual wheels for each rear wheel. Also, various numbers of wheels may be used in a heavy duty truck application having dual wheels at a number of locations. Further, the present invention is also applicable to trailers and extra spares for the detection of a detached tire pressure sensor as will be further described below.

Each tire 14 may have a respective initiator 20a-20e positioned within the wheel wells adjacent to the tire 14. Initiator 20 generates a low frequency RF signal initiator and is used to initiate a response from each wheel so that the position of each wheel may be recognized automatically by the pressure monitoring system 12. Initiators 20a-20e are preferably coupled directly to a controller 22. In commercial embodiments where the position programming is done manually, the initiators may be eliminated. Optionally, the initiators may also be eliminated where there is no need to identify individual positions of each wheel or where there is another suitable method of wheel and position association for a tire pressure sensor of interest.

Controller 22 is preferably a microprocessor based controller having a programmable CPU that may be programmed to perform various functions and processes including those set forth herein.

Controller 22 has a memory 26 associated therewith. Memory 26 may be various types of memory including ROM or RAM. Memory 26 is illustrated as a separate component. However, those skilled in the art will recognize controller 22 may have memory 26 therein. Memory 26 is used to store various thresholds, calibrations, tire characteristics, wheel characteristics, serial numbers, conversion factors, temperature probes, spare tire operating parameters, and other values needed in the calculation, calibration and operation of the pressure monitoring system 12. For example, memory may contain a table that includes the sensor identification thereof. Also, the warning statuses of each of the tires may also be stored within the table, e.g. temperature status, pressure status, and detachment status just to name a few examples of what may be considered a warning status.

Controller 22 is also coupled to a receiver 28. Although receiver 28 is illustrated as a separate component, receiver 28 may also be included within controller 22. Receiver 28 has an antenna 30 associated therewith. Receiver 30 is used to receive pressure and various information from tire pressure circuits 16a-16e. Controller 22 is also coupled to a plurality of sensors. Such sensors may include a barometric pressure sensor 32, an ambient temperature sensor 34, a distance sensor 36, a speed sensor 38, a brake pedal sensor 40, and an ignition sensor 42. Of course, various other types of sensors may be used. Barometric pressure sensor 32 generates a barometric pressure signal corresponding to the ambient barometric pressure. The barometric pressure may be measured directly, calculated, or inferred from various sensor outputs. The barometric pressure compensation is preferably used but is not required in calculations for determining the pressure within each tire 14. Temperature sensor 34 generates an ambient temperature signal corresponding to the ambient temperature and may be used to generate a temperature profile.

Distance sensor 36 may be one of a variety of sensors or combinations of sensors to determine the distance traveled for the automotive vehicle. The distance traveled may merely be obtained from another vehicle system either directly or by monitoring the velocity together with a timer 44 to obtain a rough idea of distance traveled. Speed sensor 38 may be a variety of speed sensing sources commonly used in automotive vehicles such as a tooth wheel used in anti-lock braking systems, or a transmission sensor.

Timer 44 may also be used to measure various times associated with the process set forth herein. The timer 44, for example, may measure the time the spare tire is stowed, measure a time after an initiator signal, or the elapsed non-response time of an expected sensor transmission signal.

Brake pedal sensor 41 may generate a brake-on or brake-off signal indicating that the brake pedal is being depressed or not depressed, respectively. Brake pedal sensor 41 may be useful in various applications such as the programming or calibrating of the pressure monitoring system 12.

Ignition sensor 42 may be one of a variety of types of sensors to determine if the ignition is powered on. When the ignition is on, a run signal may be generated. When the ignition is off, an off signal is generated. A simple ignition switch may act as an ignition sensor 42. Of course, sensing the voltage on a particular control line may also provide an indication of whether the ignition is activated. Preferably, pressure monitoring system 12 may not be powered when the ignition is off. However, in one constructed embodiment, the system receives information about once an hour after the ignition has been turned off.

A telemetric system 46 may be used to communicate various information to and from a central location from a vehicle. For example, the control location may keep track of service intervals and use and inform the vehicle operator service is required.

A counter 48 may also be included in control system 12. Counter 48 may count, for example, the number of times a particular action is performed. For example, counter 48 may be used to count the number of key-off to key-on transitions. Of course, the counting function may be inherent in controller 22.

Controller 22 may also be coupled to a button 50 or plurality of buttons 50 for inputting various information, resetting the controller 22, or various other functions as will be evident to those skilled in the art through the following description.

Controller 22 may also be coupled to an indicator 52. Indicator 52 may include an indicator light or display panel 54, which generates a visual signal, or an audible device 56 such as a speaker or buzzer that generates an audible signal. Indicator 52 may provide some indication as to the operability of the system such as confirming receipt of a signal such as a calibration signal or other commands, warnings, and controls as will be further described below. Indicator 34 may be an LED or LCD panel used to provide commands to the vehicle operator when manual calibrations are performed. Optionally, one of skill in the art will recognize that the indicator may also be an incandescent bulb or other indicative type devices.

Figure 2:
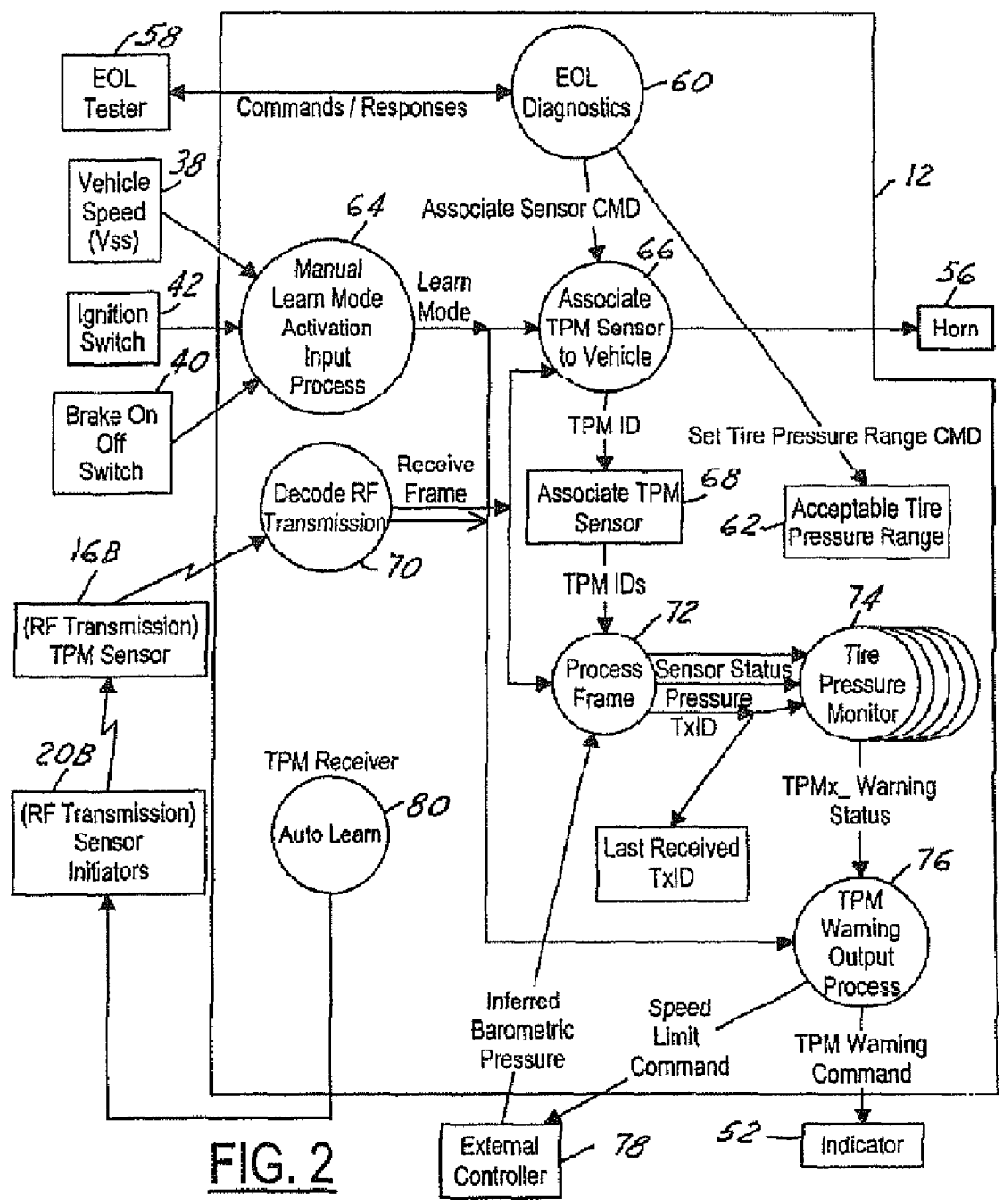
FIG. 2 is a functional flowchart of the monitoring system according to the present invention.

Referring now to FIG. 2, a pressure monitoring system 12 having various functional blocks is illustrated. These functional blocks may take place within receiver 28, controller 22, or a combination thereof. Also, memory 26 is used to store the various ranges. An end-of-line (EOL) tester 58 may also be coupled to pressure monitoring system. EOL tester 58 provides test functions to EOL diagnostic block 60. EOL tester 58 in conjunction with EOL diagnostic block 60 may be used to provide acceptable pressure ranges 62 and other diagnostic functions to determine fault within the system. The EOL tester 58 may be used in the manufacturing process to store various information in the memory such as various thresholds, tire characteristics, and to initially program the locations corresponding to the vehicle tires.

Vehicle speed sensor 38, ignition switch 42, and brake on/off switch 41 may be coupled to a manual learn mode activation input process block 64. Together block 64 and sensors 38, 41, and 42 allow an association block 66 to associate the various tire pressure sensors to the locations of the vehicles. Block 66 associates the various tire pressure sensors in the memory at block 68. The transmissions from the various sensors are decoded in block 70, which may be performed in receiver 28 above. The decoded information is provided to block 66 and to a block 72, which processes the various information such as the ranges, the various sensor locations, and the current transmission process. Optionally, the decoded information may also directly pass to block 76. In the processing frame the sensor status pressure and transmission ID may be linked to a tire pressure monitor 74, which may be used to provide a warning status to an output block 76, which, in turn, may provide information to an external controller 78 and to indicator 52. Other features of FIG. 2 will be apparent from the detailed discussion of the present invention described in further detail below.

Figure 3:
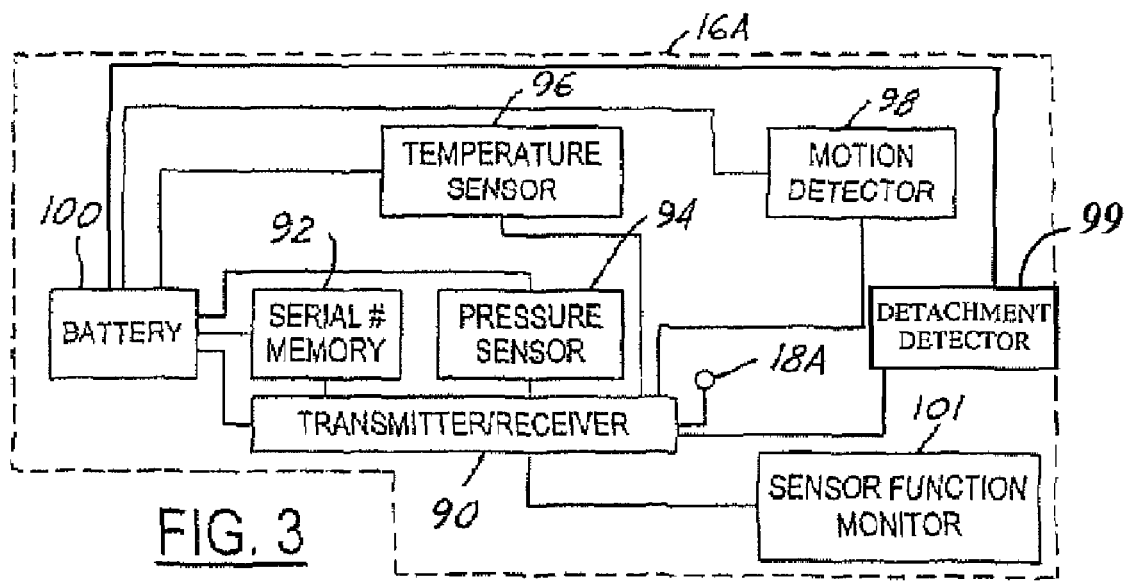
FIG. 3 is a block diagrammatic view of a pressure transmitter according to the present invention.

Referring now to FIG. 3, a typical tire pressure sensor circuit 16a is illustrated. Although only one tire pressure sensor circuit 16 is shown, each may be commonly configured and contained within a tire pressure sensor. Pressure monitoring system 12 has a transmitter/receiver or transceiver 90. Transmitter/receiver 90 is coupled to antenna 18a for transmitting various information to receiver 28. The receiver portion may be used to receive an activation signal for an initiator located at each wheel. The pressure sensor may have various information such as a serial number memory 92, a pressure sensor 94 for determining the pressure within the tire, a temperature sensor 96 for determining the temperature within the tire, a motion detector 98, which may be used to activate the system pressure sensing system, and a detachment detector 99, which may be used to monitor sensor-to-wheel coupling. The initial message is referred to as a "wake" message, meaning the pressure sensing circuit is now activated to send its pressure transmissions and the other data. The "wake" message may be initiated outside or inside of the tire pressure sensor circuit or may be initiated by an event such as pressure sensor detachment.

Each of the transceiver 90, serial number memory 92, pressure sensor 94, temperature sensor 96, motion sensor 98 and detachment detector 99 are coupled to battery 100. Battery 100 is preferably a long-life battery capable of lasting through the life of the tire. In order to avoid or minimize servicing of the tire pressure sensor, there is a preference in selecting low power consumption robust components for sensor construction.

A sensor function monitor 101 may also be incorporated into the tire pressure sensor circuit 16. Sensor function monitor 101 generates an error signal when various portions of the tire pressure circuit are not operating or are operating incorrectly. Also, sensor function monitor may generate a signal indicating that the circuit 16 is operating normally.

Similar to the sensor function monitor, the detachment detector 99 is incorporated into the tire pressure sensor circuit 16. The detachment detector 99 generates a detached signal when the tire pressure sensor becomes detached from the wheel of the tire. Also, detachment detector may generate a signal indicating that the tire pressure sensor is properly attached.

Figure 4:
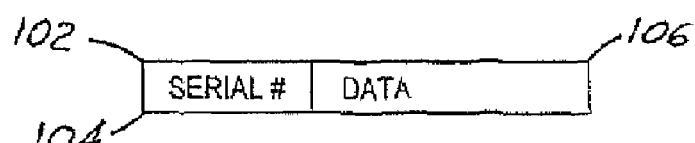
FIG. 4 is a diagrammatic view of a digital word from a pressure transmitter.

Referring now to FIG. 4, a word 102 generated by the tire pressure sensor circuit 16 of FIG. 3 is illustrated. Word 102 may comprise a transmitter identification serial number portion 104 followed by a data portion 106 in a predetermined format. For example, data section 106 may include a wake or initial status pressure information followed by temperature information. Motion detector 98 or detachment detector 99 may initiate the transmission of the word 102 to the transmitter/receiver 90. The word 102 is preferably such that the decode RF transmission block 70 is able to decode the information and validate the word while providing the identification number or serial number, the pressure, the temperature, and a sensor function. In the situation when the detachment detector 99 initiates the word 102, the warning output process block 76 directly receives the decoded word, thereby providing a warning signal. It is recognized that the signal or state of the detachment detector 99 may be transmitted with the word 102 at any time or when initiated to do so.

Figure 5:
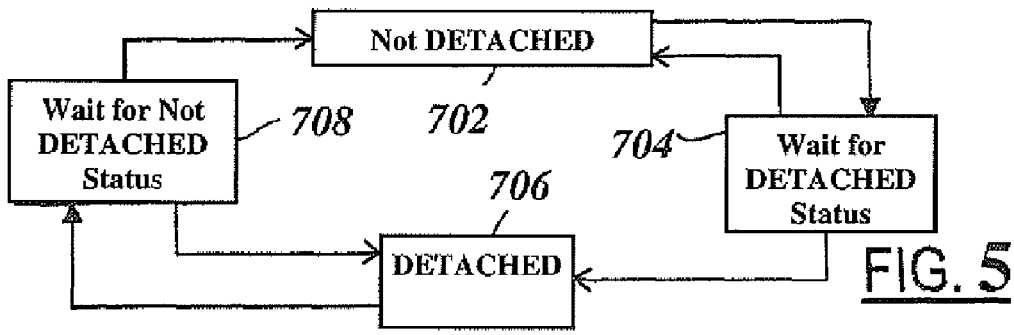
FIG. 5 is a state diagram of detached tire pressure sensor status according to the present invention.

Referring now to FIG. 5, shown is a state diagram of detached tire pressure sensor status according to the present invention. In block 702 the detached tire pressure sensor status is not detached. To move from block 702 to 704 the sensor attachment to the wheel becomes detached. When the detachment detector 99 posts a signal indicating detachment for one of the wheels, block 704 determines a detached status. When subsequent readings of the detachment detector are not detached, then block 702 is again executed. In block 704, if the detached status criteria are met, a detached status is generated and block 706 is executed. The thresholds for triggering the detachment detector may be offset slightly to provide hysteresis. In block 706 when the detachment reading becomes an attached reading then block 708 is executed. If subsequent readings of the detachment detector are detached, then block 706 is again executed. In block 708, when the not detached status criteria are met, a not detached status is generated and block 702 is again executed.

Figure 6:
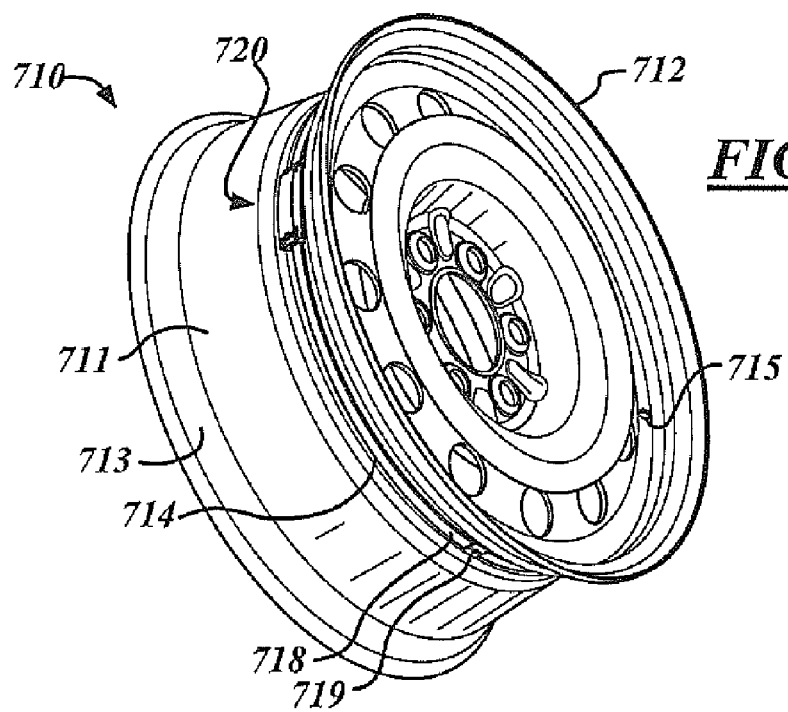
FIG. 6 is a perspective view of a rim mount tire pressure sensor assembly using the present invention to advantage.

Turning now to FIG. 6, a perspective view is shown of a rim mount tire pressure sensor assembly or TPMS sensor assembly 720 using the present invention to advantage. The TPMS sensor assembly 720 is connected to a wheel 710 for use on an automotive vehicle. The wheel 710 may selectively receive a tire (not shown) for use in an automotive vehicle (not shown). The wheel 710 typically includes a wheel rim 711 having outside rim flange 712 and inside rim flange 713 for sealingly receiving a tire. The wheel 710 typically has a drop center portion or drop well 714 disposed along its circumference. The drop well 714 is recessed below the flanges 712, 713 and may be located near the center of the wheel 710. The wheel rim 711 includes a valve stem port 715 for sealingly receiving a valve stem assembly (not shown). The valve stem assembly may be used to fill the wheel with a gas, i.e., air, when a valve stem assembly and tire are appropriately mounted upon the wheel 710.

A TPMS sensor assembly 720 is positionably located in the drop well 714 of the wheel 710 by an adhesive strip. In this embodiment the assembly is located 180 degrees from the valve stem port 715. The TPMS sensor assembly 720 is further secured to the drop well 714 by a strip or band 718. The band 718 is secured around the wheel 710 at a band buckle 719. The location of the band buckle 719 may vary, but preference is given to locating the band buckle 719 opposite the sensor assembly 720. FIG. 6 shows, for illustrative purposes, the band buckle 719 located 90 degrees from the valve stem port 715. Locating the band buckle opposite that of the sensor assembly 720 may provide for optimum balancing of the tire and wheel assembly.

The TPMS sensor assembly 720 facilitates the high-speed assembly procedure for mounting and securing the band 718, the assembly 720, wheel 710 and band buckle 719. It is recognized that the band 718 and band buckle 719 may include adjustable band combinations, fixed band combinations, reusable band and buckle combinations, and single use band and buckle combinations. Also recognized, a crimp or dimple buckle with a one-size band may be used to advantage in high production application, such as during OEM operations, or a worm-geared fastener with band may be used to advantage in low production application, such as during a service operation at a tire center. The high-speed assembly procedure using the band 718, band buckle 719 and structure 724 to a wheel to advantage may achieve an assembly rate upwards of 300 pieces per hour. The present invention also provides an optional verification step during the production process for verifying that the TPMS sensor assembly is properly attached to the wheel.

Figure 7:
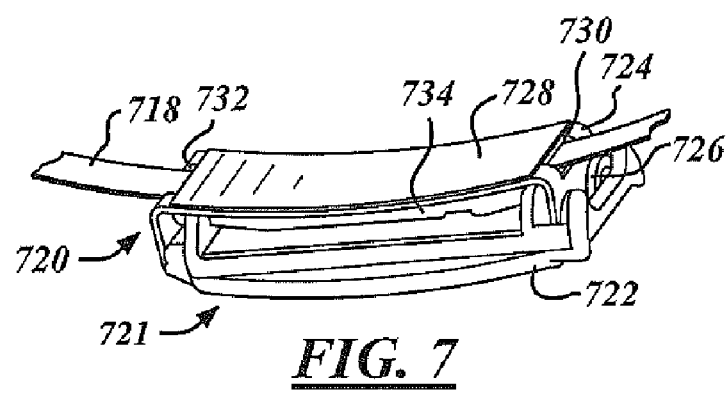
FIG. 7 is a perspective view of the attachment band and the tire pressure sensor assembly of FIG. 6.

FIG. 7 is a perspective view of the attachment band 718 and the tire pressure sensor assembly 720 of FIG. 6. The TPMS sensor assembly 720 includes a sensor 721 having a sensor housing 722, a device or structure 724 releasably connected to the sensor housing 722, and a CPA 726 releasably connected to the sensor housing 722. The CPA 726 is only insertable into the housing when the sensor housing 722 is fully engaged in the structure 724. Also, the TPMS sensor assembly 720 includes a double-sided tape 728 used to attach the assembly 720 to the drop well 714.

The structure 724 includes a first port 730 and a second port 732 for receiving the band 718 through the structure 724. The sensor housing 722 may include a band guide 734, which helps to guide the band 718 from the first port 730 to the second port 732 when the sensor housing 722 is connected to the structure 724. These assurance features together with the present invention provide for a robust system for attachment verification during assembly or subsequent assurance of not detached when the tire pressure sensor is in service.

Figure 8:
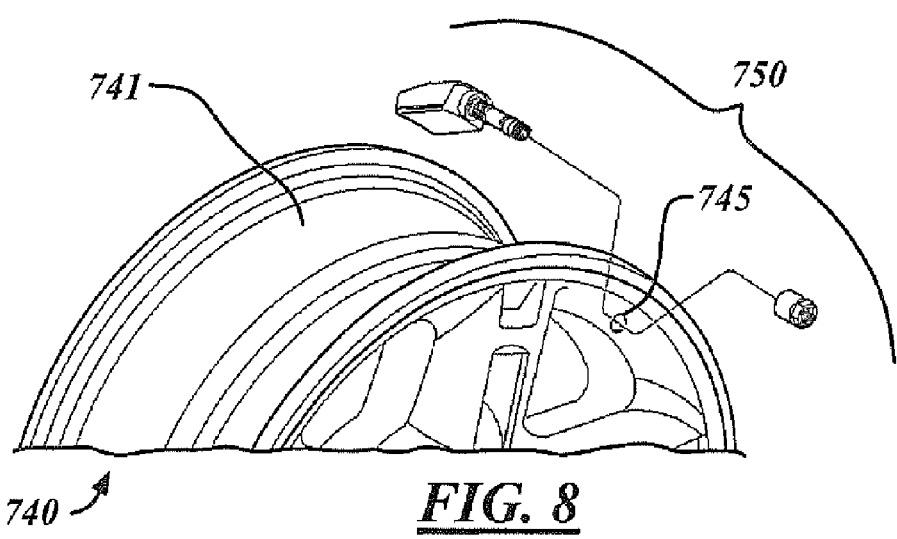
FIG. 8 is a perspective view of a valve mount tire pressure sensor assembly using the present invention to advantage.

FIG. 8 is a perspective view of a valve mount tire pressure sensor assembly 750 using the present invention to advantage. This TPMS sensor assembly 750 is designed to mount in a valve stem port 745 of a wheel rim 741 of a wheel 740 (again the tire and the fill fluid are not shown).

Figure 9:
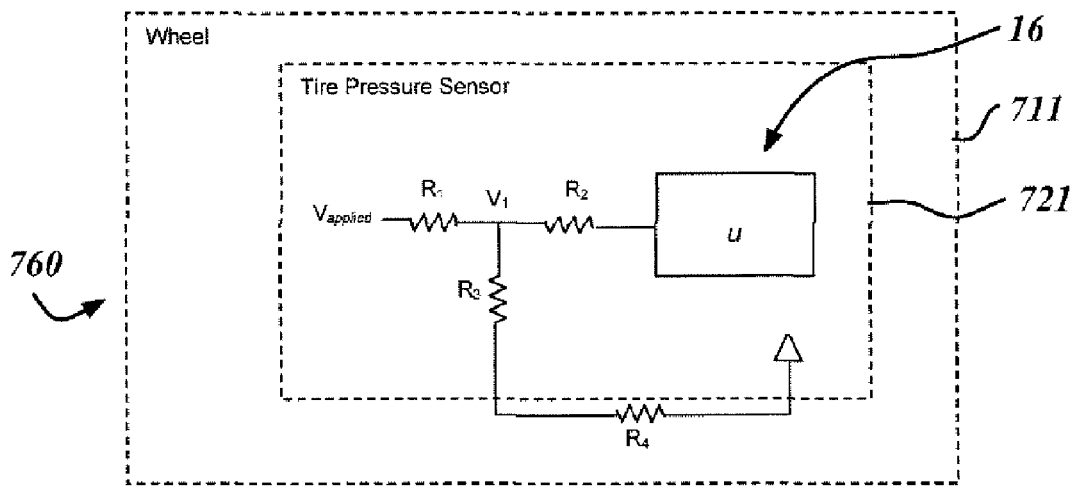
FIG. 9 is a comparator circuit used to advantage for sensor detachment detection in the present invention.
Figure 10:
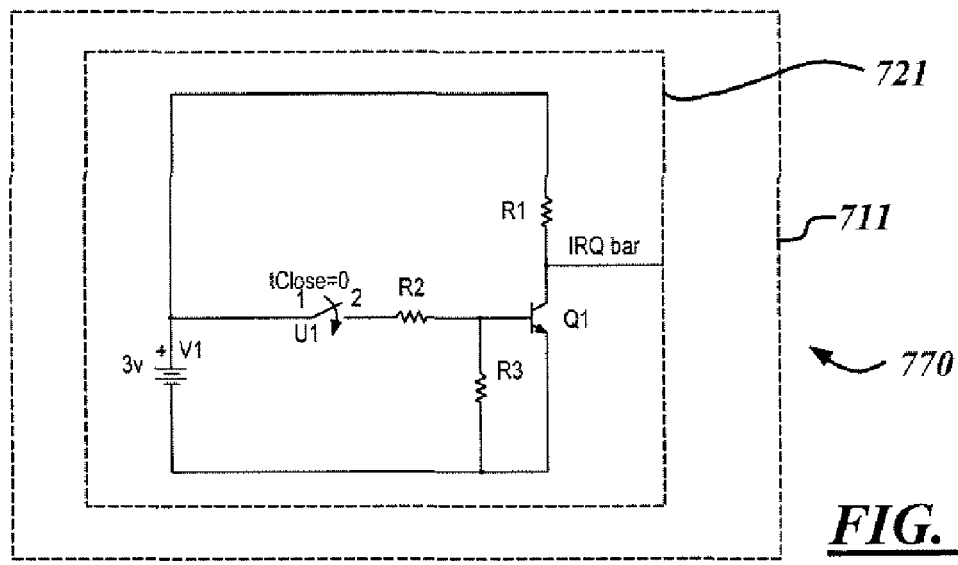
FIG. 10 is a switch circuit used to advantage for sensor detachment detection in the present invention.
Figure 11:
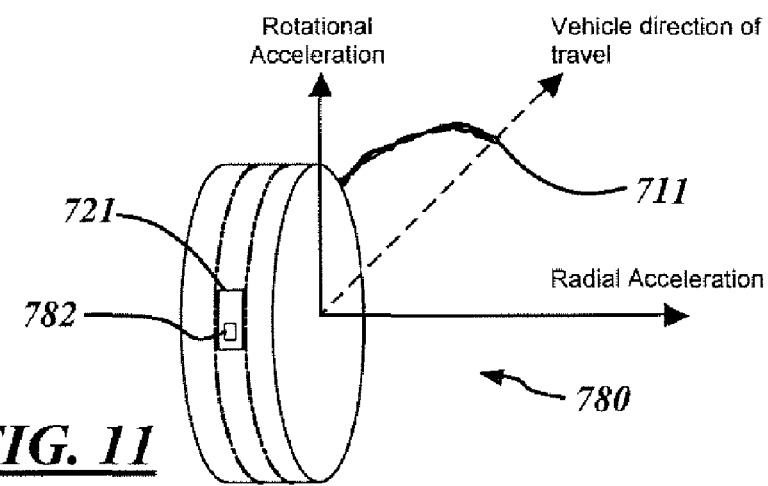
FIG. 11 is a representative acceleration diagram of an accelerometer used to advantage for sensor detachment detection in the present invention.

Both the rim mount tire pressure sensor assembly 720 and the valve mount tire pressure sensor assembly 750 may include the sensor circuit 16 as described above. It is recognized that alternative sensor circuits may be used, which may have a greater or lesser numbers of features and components, but the sensor circuit of the present invention will include the detachment detector 99 and at least a power source and a transmitter. FIGS. 9, 10 and 11 present three different possible implementations of the detachment detector 99. It is recognized that a person of skill in the art will readily understand the ensuing circuit diagrams or implementation of the sensor circuit; accordingly, the remaining discussion will focus on the functionality of each detachment detector solution presented.

FIG. 9 is a comparator circuit 760 used to advantage for sensor detachment detection in the present invention. The electronics of the TPMS sensor assembly may include the simple voltage divider/comparator circuit as shown. In this embodiment, the sensor monitors the voltage V1 to determine the status of the sensor with respect to the mounting condition or detachment state, i.e., whether attached or detached. The impedance R4 is determined by the fastening method of the sensor 721 to the wheel rim 711, valve steam 745 or band 718, or, alternatively, may include any combination of components between the sensor circuit 16 of the sensor 721 and the wheel rim 711, for example. The impedance R4 completes the comparator circuit 760 in the sensor circuit 16. An advantage of this solution is that R4 can represent several attributes with respect to the attachment mechanism for the particular application. For example, in FIG. 6 a rim mount solution is applied. In this case, R4 could be integrated with the band 718, the structure 724 or sensor housing 722, or any combination thereof. If the valve mount solution in FIG. 8 is used, R4 could be integrated between the sensor body and the valve stem port 745. In either case, under normal conditions (attached) V1 will be:

$$V_1 \cong \frac{V_{applied}(R_3 + R_4)}{(R_1 + R_3 + R_4)}$$

If the sensor 721 becomes detached from the wheel rim 711, the impedance R4 will tend to infinity and the voltage V1 will be approximately equal to the reference voltage $V_{applied}$, in which case the sensor circuit 16 would set the state of the sensor 721 to a detached state. Using the voltage divider/comparator circuit it is anticipated that the resistors R1, R2, and R3 would be selected for lower power consumption. Moreover, this circuit might be incorporated with a transistor circuit configured for even lower power consumption in order to further the life of the tire pressure sensor.

FIG. 10 is a switch circuit 770 used to advantage for sensor detachment detection in the present invention. The electronics of the detachment detector of the tire pressure sensor 721 may include the representative circuit as shown. This solution utilizes a switch or switching mechanism U1 to detect a detached tire pressure sensor. The switch U1 can be used with either of the two mounting mechanisms shown in FIGS. 6 and 8. The switch itself can represent any switch including but not limited to a standard mechanical 'plunger' or a magnetic reed switch.

For a mechanical 'plunger' type switch, the TMPS sensor assembly would have to accommodate this solution. For example, the rim mount solution could incorporate a through-put (not shown) into the structure 724 and or the band 718 to allow the switch to interface with the wheel rim 711 directly from the sensor 721. Likewise, the through-put could be limited to between the sensor 721 and structure 724 rather than between the entire sensor assembly and the wheel. Under normal conditions, the switch would remain normally open. Likewise, in a detach state or event, the switch would close completing the circuit and the sensor would respond accordingly.

For a magnetic reed switch, a magnet could be integrated into the wheel rim. In the presence of the magnetic field the switch would remain normally open. Again, in a detach event the switch U1 would close, thus completing the circuit and a sensor would respond accordingly.

The switch U1 of the circuit 770 is configured as normally open (IRQ_bar is in a high state), the circuit requires near zero current consumption, i.e., very low power when IRQ_bar is monitored with the interrupt circuit. This solution extends the operational life of the pressure sensor 721 by conserving power stored in the battery 100. Should the sensor 721 become separated from the wheel rim 711, switch U1 would close and IRQ_bar would go to a low state with power now being consumed with little concern. This configuration is also advantageous because servicing of the sensor is required only when in a detached state in order to reattach the sensor to the wheel, which may include reconditioning or replacement of the sensor with a fully charged battery. This configuration eliminates the onerous need for servicing of the battery that would be required for a normally closed detachment detector.

FIG. 11 is a representative acceleration diagram 780 of an accelerometer 782 used to advantage for sensor detachment detection in the present invention. The detachment detector 99 of the sensor 721 may include one or more oriented accelerometer 782. Generally, the wheel 710 of a vehicle has a rotational acceleration, radial acceleration and a direction of travel as shown in the figure. For the most part, each of the acceleration components of a wheel may be referenced to the spindle or axle to which the wheel assembly is attached. When the sensor 721 is attached to the wheel rim 711, it will also undergo similar acceleration as the wheel 710 attached to the spindle or axle.

Rotational acceleration is expected during normal vehicle motion. The acceleration having the dominant magnitude is generally in the rotational acceleration direction. Accordingly, a properly mounted sensor will also see the dominant rotational accelerations in the same general direction. However, the radial acceleration is nearly always at a minimum in the axial direction. Radial accelerations occur or are expected to occur when there is a change in the direction of vehicle travel, there is a slide slip condition between the tire and road surface, or when there is an abnormal dynamic situation. Accordingly, a detachment detector may use an accelerometer to advantage by orienting a radial accelerometer component 782 in the same axial direction as the sensor 721, where the sensor 721 is mountable to a wheel rim 721 thereby maintaining the principal acceleration orientation. The detachment detector 99 may then monitor the acceleration. If an acceleration threshold is surpassed within the radial acceleration direction and sustained or repeated beyond a predetermined threshold, time or number of steps, then the sensor 721 may broadcast to the tire pressure monitoring system 12 that the sensor has become detached in accordance with the method presented herein.

Also, the tire pressure sensor 721 may use a multi-axis accelerometer to detect a detached sensor. Under normal conditions the rotational acceleration will be the dominant component of the acceleration forces. There may be some radial acceleration depending on road surface conditions and/or vehicle maneuvering. Because there are two accelerometer components, the misalignment of sensor 721 on the wheel rim 711 may be corrected into a normalized rotational acceleration and a normalized radial acceleration. The normalization is accomplished by algorithm or by initial parameterization by using the relationship that under normal conditions the radial acceleration is expected to be negligible. However, in the event that the sensor 721 becomes detached from the wheel, the sensor orientation will become random and the normalized radial acceleration would have significant content. When a significant radial acceleration is detected, the tire pressure sensor will respond to indicate that the attachment of the sensor has been compromised. Again, the determination of significant radial acceleration may include a conditioning circuit based upon threshold, lapsed time and/or cycle counts of a processor, wheel rotation or acceleration impulses. The advantage of this solution is that it is not dependent on the type of attachment used to mount the sensor to the wheel in order to determine the detachment state. However, this solution may require recharging of the battery or more frequent servicing of the tire pressure sensor.

The above examples for the detachment detector 99 are possible designs that identify detachment of the sensor from the wheel rim. It is contemplated that the detachment detector may also be used to identify when the sensor becomes detached from its base, cradle, band, or any other constituent component prior to the sensor actually becoming dislodged from the wheel rim, thereby providing a preventative measure of detection.

While particular embodiments of the invention have been shown and described, numerous variations and alternate embodiments will occur to those skilled in the art. Accordingly, it is intended that the invention be limited only in terms of the appended claims.

What is claimed is:

1. A method of operating a tire pressure monitoring system for the detection of a detached tire pressure sensor in a wheel comprising:
   detecting a detachment state of a tire pressure sensor; and
   transmitting a word including said detachment state.

2. A method as recited in claim 1 wherein the detachment state is determined from a detachment detector included within a pressure sensor circuit of said tire pressure sensor.

3. A method as recited in claim 1 wherein said detachment state has one of a detached state or a not detached state.

4. A method as recited in claim 1 further comprising receiving said word and decoding said word.

5. A method as recited in claim 4 further comprising generating a warning signal when said decoded word includes a not detached state.

6. A method as recited in claim 5 wherein said warning signal is indicative of said detached state.

7. A method as recited in claim 2 wherein said detachment detector in said circuit is a low power element.

8. A method as recited in claim 2 wherein said detachment detector in said circuit is a comparator circuit.

9. A method as recited in claim 2 wherein said detachment detector in said circuit is a switch circuit.

10. A method as recited in claim 2 wherein said detachment detector includes at least one oriented accelerometer.

11. A method as recited in claim 10 wherein said oriented accelerometer is a radial accelerometer, whereby said detachment state of said sensor is determined by exceeding a predetermined threshold or by sustained excessive accelerations.

12. A method as recited in claim 11 wherein sustained excessive acceleration may be determined by time or by count within a given time period.

13. A method as recited in claim 1 further comprising generating a wake signal, wherein detecting said detachment state is in response to said wake signal.

14. A method of operating a tire pressure monitoring system for the determination of a tire pressure sensor status in a wheel comprising:
    conditioning a detachment detector;
    detecting a detachment state from said detachment detector; and
    transmitting a said detachment state to said system.

15. A method as recited in claim 14 further comprising receiving said detachment state and indicating said detachment state when said detachment state indicates detached.

16. A method as recited in claim 14 wherein said detachment state is transmitted in a word.

17. A tire pressure monitoring system for detachment detection of a tire pressure sensor comprising:
    a tire pressure sensor having a transmitter for transmitting a word having a detachment state;
    a receiver for receiving said word; and
    a controller coupled to said receiver, said controller decoding said word determining said detachment state.

18. A system as recited in claim 17 further comprising a display for signaling a desired action based upon said received detachment state.

19. A system as recited in claim 18 wherein said desired action includes displaying said detachment state and tire location on said display when said detachment state is detached.

20. A system as recited in claim 17 wherein said tire pressure sensor includes a battery, a transmitter and a detachment detector, wherein said detachment detector determines said detachment state.

* * * * *